(12) United States Patent
Kokogawa

(10) Patent No.: US 6,991,358 B2
(45) Date of Patent: Jan. 31, 2006

(54) PLANAR LIGHT SOURCE UNIT AND DISPLAY DEVICE

(75) Inventor: Toru Kokogawa, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 175 days.

(21) Appl. No.: 10/649,688

(22) Filed: Aug. 28, 2003

(65) Prior Publication Data

US 2004/0109244 A1 Jun. 10, 2004

(30) Foreign Application Priority Data

Dec. 4, 2002 (JP) ............................. 2002-352031

(51) Int. Cl.
*F21V 7/04* (2006.01)
*G02F 1/1335* (2006.01)

(52) U.S. Cl. ...................... 362/619; 362/606; 362/600; 362/331; 362/333; 362/339; 349/62

(58) Field of Classification Search ................. 362/31, 362/330, 331, 333, 339; 349/62, 64, 65, 349/67
See application file for complete search history.

(56) References Cited

U.S. PATENT DOCUMENTS

| | | | |
|---|---|---|---|
| 6,020,944 A * | 2/2000 | Hoshi | 349/62 |
| 6,172,809 B1 * | 1/2001 | Koike et al. | 359/487 |
| 6,334,690 B1 * | 1/2002 | Ohkawa | 362/31 |
| 6,669,350 B2 * | 12/2003 | Yamashita et al. | 362/31 |
| 6,746,130 B2 * | 6/2004 | Ohkawa | 362/31 |
| 6,846,098 B2 * | 1/2005 | Bourdelais et al. | 362/330 |
| 6,874,902 B2 * | 4/2005 | Yamashita et al. | 362/330 |
| 2002/0114149 A1 * | 8/2002 | Yamashita et al. | 362/31 |
| 2003/0058386 A1 * | 3/2003 | Bastiaansen et al. | 349/100 |
| 2003/0095400 A1 * | 5/2003 | Kashima et al. | 362/31 |
| 2004/0022050 A1 * | 2/2004 | Yamashita et al. | 362/31 |

FOREIGN PATENT DOCUMENTS

| | | |
|---|---|---|
| JP | 11-295713 | 10/1999 |
| JP | 2002-231029 | 8/2002 |

* cited by examiner

*Primary Examiner*—John Anthony Ward
*Assistant Examiner*—Jacob Y. Choi
(74) *Attorney, Agent, or Firm*—Oblon, Spivak, McClelland, Maier & Neustadt, P.C.

(57) ABSTRACT

A light guide plate has a hologram pattern on a light exit surface. The hologram pattern anisotropically diffuses light in the direction parallel with a light incident surface of the light guide plate. On a back surface of the light guide plate are formed mirror-polished prism structures extending parallel with the light incident surface. A downward-pointing prism sheet with a given prism apex angle is placed on the light exit surface of the light guide plate. The use of the downward-pointing prism sheet together with the light guide plate having the anisotropic diffusion hologram pattern integrally formed thereon produces a liquid crystal display device with enhanced luminance properties.

16 Claims, 3 Drawing Sheets

PLANAR LIGHT SOURCE UNIT AND DISPLAY DEVICE

BACKGROUND OF THE INVENTION

1. Field of the Invention

The present invention relates to a planar light source unit and a display device, and more particularly, to a planar light source unit and a display device having a light guide plate with an anisotropic diffraction grating, and a downward-pointing prism sheet.

2. Description of the Related Art

Liquid crystal display devices are widely used as image display devices for personal computers and various types of monitors. The liquid crystal display devices generally include a liquid crystal display panel and a backlight unit mounted on the back of the panel. The liquid crystal display panel displays images by controlling transmission of light. Among several types of liquid crystal display devices is one employing a sidelight (or edgelight) type backlight unit. A light source is positioned at the side of a display surface in this type of liquid crystal display device so as to make the device assembly as thin as possible.

The sidelight type backlight units generally include a light guide plate for guiding light from a light source and a reflection sheet placed on the back of the light guide plate. The backlight unit further has a diffusion sheet for diffusing light for uniform surface illumination and a prism sheet for collecting light from the light guide plate and directing the light vertically to the display surface.

There are two types of prism sheets: a downward-pointing prism sheet that is placed so that a prism surface where prism structures are formed faces toward a light guide plate, and an upward-pointing prism sheet placed so that the prism surface faces toward a display surface.

The prism sheet may be replaced by a hologram sheet to achieve more efficient use of light and higher front luminance. This technique is described in Japanese Unexamined Patent Application Publication H11-295713. A backlight unit according to this technique has a light guide plate, hologram sheet, and diffusion sheet. The hologram sheet is placed above the light guide plate with a certain space inbetween, and the diffusion sheet is placed above the hologram sheet. The hologram sheet bends the obliquely incident light from the light guide plate in the direction normal to a display so as to increase front luminance. The hologram sheet allows more efficient use of light than the prism sheet, thus achieving higher luminance.

Another known technique employs a backlight unit having a light guide plate with a scattering hologram on the top surface and a light diffusing pattern on the bottom surface. This technique is described in Japanese Unexamined Patent Application Publication No. 2002-231029. The scattering hologram is composed of a diffraction grating being integral with the light guide plate. The scattering hologram lets the light traveling through the light guide plate exit from the light guide plate. It bends the exiting light in the direction substantially perpendicular to the exit surface of the light guide plate and scatters the light.

The light having passed through the scattering hologram thus becomes the scattered light with the center light rays substantially perpendicular to the exit surface, and high light use efficiency is achieved while the light is scattered. Since the scattering hologram has both light collecting effect and light scattering effect, it eliminates the need for a prism sheet for collecting light on the front surface and a scattering sheet for scattering light, thereby increasing luminance. Japanese Unexamined Patent Application Publication No. 2002-231029 further describes a technique that employs an on-axis scattering hologram sheet on the top surface of a light guide plate. The on-axis scattering hologram sheet is able to scatter light, but unable to deflect light. Thus, a downward-pointing prism sheet is placed between the scattering hologram sheet and the light guide plate so as to bend light in the direction normal to a display.

Another known technique in which a light guide plate and a hologram are integrally formed employs a backlight unit having a light guide plate with a hologram pattern on the top surface and smooth prism structures on the bottom surface. The hologram pattern scatters light in the directions which are in-plane of the top surface of the light guide plate and perpendicular to the incident direction of light on the light guide plate. The prism structures on the bottom surface change the light path to let the light exit from the light guide plate at a given angle.

As described above, there are several known techniques for making a planar light source unit having a light guide plate with a hologram pattern, and a prism sheet. Not enough study, however, has been done on the relationships between particular prism sheets and light guide plates with a particular hologram pattern. Thus, not high enough light use efficiency and luminance have been achieved.

SUMMARY OF THE INVENTION

Accordingly, an object of the present invention is to provide a planar light source unit and a display device having high light use efficiency and enhanced luminance characteristics.

A planar light source unit according to the present invention includes a light source, a light guide plate, and a prism sheet. The light guide plate has a light incident surface through which light from the light source enters and a light exit surface through which light exits. The light guide plate also has an anisotropic diffraction grating formed on the light exit surface or a surface opposite to the light exit surface. The anisotropic diffraction grating diffuses light in a principal diffusing direction along the light incident surface. The prism sheet collects light traveling from the light incident surface to an opposite side surface. The prism sheet has a plurality of prism structures on a surface opposite to the light exit surface. Each of the plurality of prism structures has an apex angle of larger than 65 degrees and smaller than 68 degrees. This configuration provides the planar light source unit with enhanced luminance characteristics.

It is preferable in the above planar light source unit that the anisotropic diffraction grating comprises a hologram pattern integrally formed on the light guide plate. This configuration allows effective control of light diffusion. Further, the anisotropic diffraction grating preferably does not substantially diffuse light in the direction perpendicular to the principal diffusion direction. This increases the front luminance. Furthermore, an apex angle of each of the plurality of prism structures is preferably 66 degrees. This configuration further enhances the luminance characteristics.

It is also preferable in the above planar light source unit that the light guide plate has smooth prism structures on a surface opposite to a surface where the anisotropic diffraction grating is formed. The smooth prism structures controls an emission angle of light exiting through the light exit surface. This configuration allows suppressing light scattering to increase the front luminance. Further, the prism sheet is preferably directly placed on the light exit surface. This suppresses the decrease of the luminance.

A display device according to the preset invention includes a planar light source unit and a display panel displaying images by controlling transmission of light from the planar light source unit. The planar light source unit includes a light source, a light guide plate, and a prism sheet. The light guide plate has a light incident surface through which light from the light source enters and a light exit surface through which light exits. The light guide plate also has an anisotropic diffraction grating formed on the light exit surface or a surface opposite to the light exit surface. The anisotropic diffraction grating diffuses light in a principal diffusing direction along the light incident surface. The prism sheet collects light traveling from the light incident surface to an opposite side surface. The prism sheet has a plurality of prism structures on a surface opposite to the light exit surface. Each of the plurality of prism structures has an apex angle of larger than 65 degrees and smaller than 68 degrees. This configuration provides the planar light source unit with enhanced luminance characteristics.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

In the following, possible embodiments to which the present invention may be applied will be explained in detail. A backlight unit according to a preferred embodiment of this invention has a light guide plate and a prism sheet placed so that a prism surface where prism structures are formed faces the light guide plate. An anisotropic diffraction grating is formed on the upper or bottom surface of the light guide plate. The anisotropic diffraction grating is preferably a hologram pattern. The surface of the light guide plate where the hologram pattern is formed will be referred to hereinafter as a hologram surface. The backside of the hologram surface has a surface structure to control a light exit angle. An apex angle of each of the prism structures is larger than 65 degrees and smaller than 68 degrees. From the invention described in the following, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Figure 1:
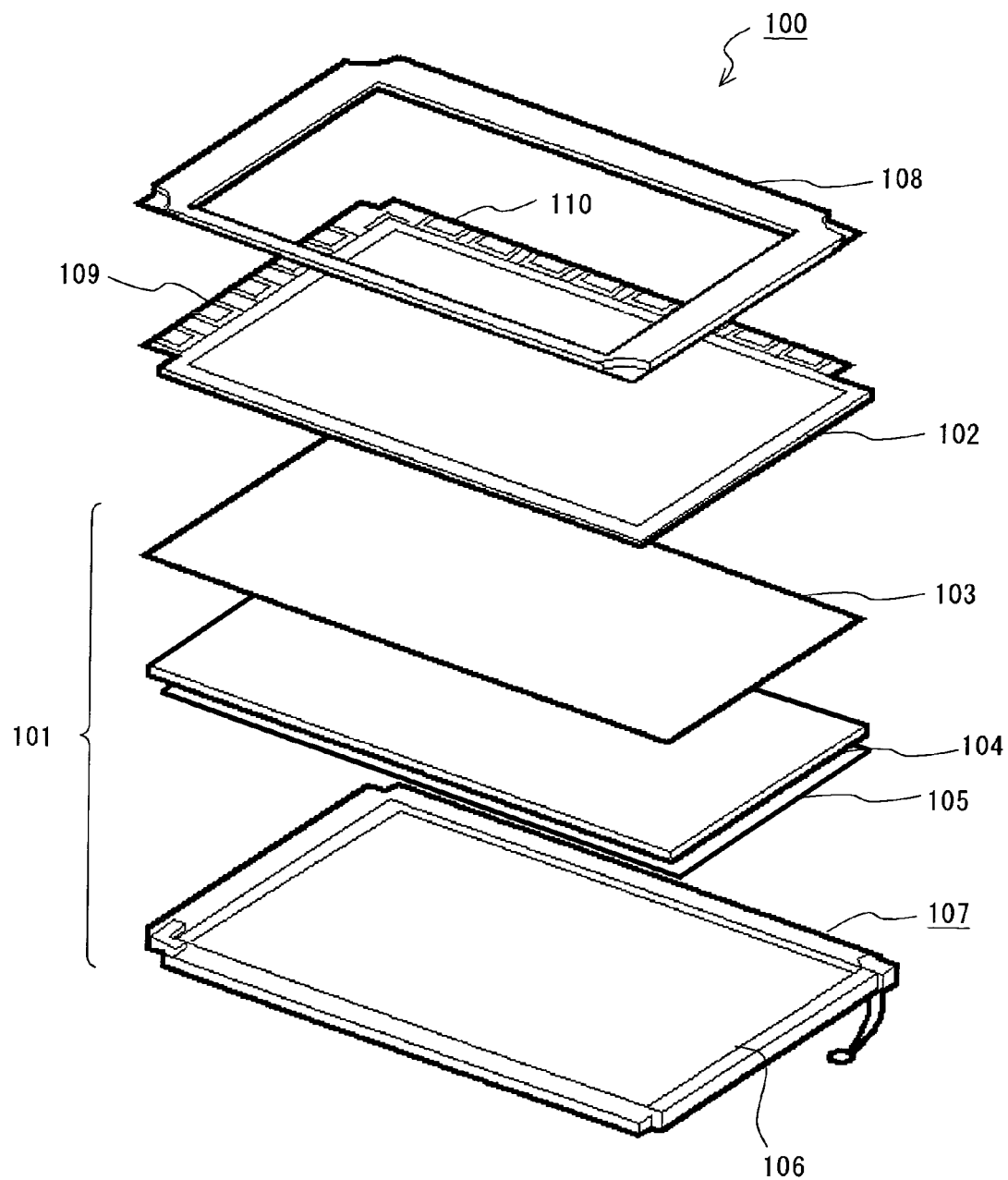
FIG. 1 is an exploded perspective view showing a schematic structure of a liquid crystal display device according to a preferred embodiment of the present invention.

FIG. 1 is a perspective view to explain an overall structure of a liquid crystal display module according to this embodiment. It schematically shows a liquid crystal display module 100 employing a sidelight type backlight unit. The liquid crystal display module 100 has a backlight unit 101 and a liquid crystal display panel 102 where driver integral circuits (ICs) are mounted. It also has a prism sheet 103 for collecting light to increase the front luminance, a light guide plate 104 for guiding and scattering light from a light source, and a reflection sheet 105 for reflecting incident light. The light guide plate 104, the prism sheet 103, and other components of the backlight unit 101 are contained in a frame 106, which is generally formed by organic resin such as polycarbonate. The frame 106 can contain the liquid crystal display panel 102. The liquid crystal display module 100 also has a light source 107 such as a cold cathode fluorescent lamp (CCFL) and light emitting diode (LED), which is not specified in FIG. 1. The liquid crystal display panel 102 and the backlight unit 101 are supported and protected by a bezel 108.

The backlight unit 101 includes the prism sheet 103, light guide plate 104, reflection sheet 105, frame 106, and light source 107. The liquid crystal display panel 102 has a display area composed of a plurality of pixels arranged in a matrix, and a peripheral area surrounding the display area. The liquid crystal display panel 102 includes an array substrate where array circuits are formed and a counter substrate, and liquid crystals are encapsulated between the two substrates.

A color liquid crystal display device has a color filter including red, green, and blue sections. Each pixel in the display area of the liquid crystal display panel 102 displays one of red, green, and blue. In a black and white display device, a pixel displays white or black. A plurality of signal lines and gate lines are formed in a matrix in the display area on the array substrate. The signal lines and the gate lines cross each other at substantially right angles. Pixels are selected according to a gate voltage from a gate driver IC 109, and an electric field is applied to liquid crystals of the selected pixels according to a display signal voltage from a source driver IC 110.

Though the driver ICs are generally connected to the array substrate with tape automated bonding (TAB), they may be directly mounted on or formed on the array substrate. Generally, a plurality of source driver ICs 110 for signal lines are provided along the X axis side of the TFT array substrate, and a plurality of gate driver ICs 109 for gate lines to control a gate voltage are provided along the Y axis side. A voltage output from the source driver IC 110 is transmitted to a pixel electrode via source and drain electrodes of a TFT, and the pixel electrode and a common electrode apply an electric field to the liquid crystals. Changing the voltage results in changing the applied voltage to the liquid crystals, thereby controlling light transmittance of the liquid crystals. A circuit to supply a common electric potential to the common electrode is constructed on a control circuit substrate (not shown). Besides the active matrix type described above, there is a passive matrix type liquid crystal display panel with no switching element. The present invention is applicable to various types of liquid crystal display panels. It is also applicable to various types of display devices in which a display panel controls light from a planar light source unit.

Figure 2:
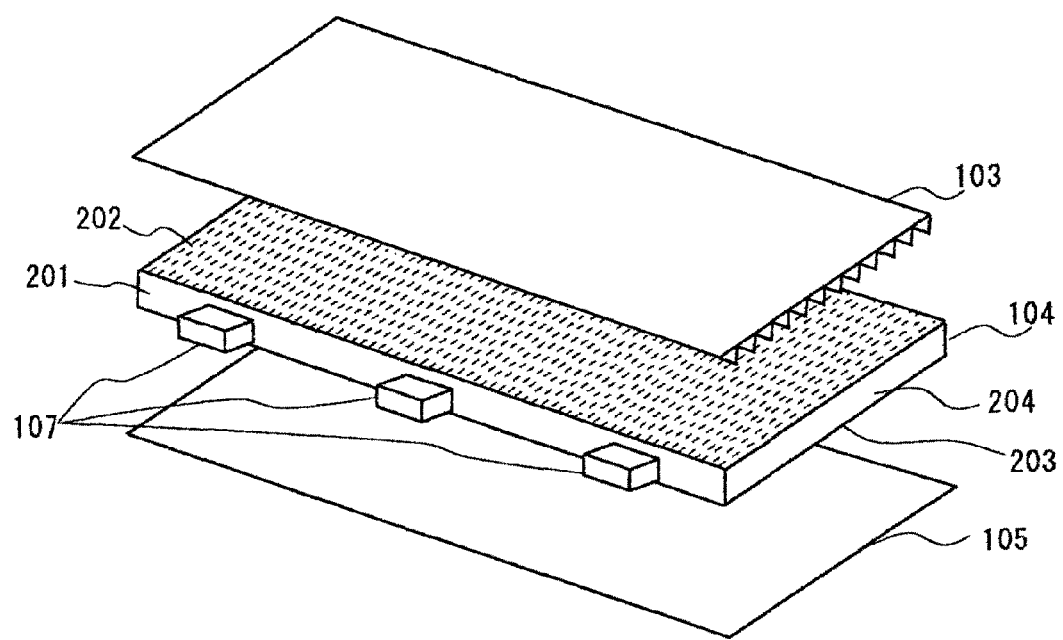
FIG. 2 is an exploded perspective view showing a schematic structure of a backlight unit according to a preferred embodiment of the present invention.
Figure 5:
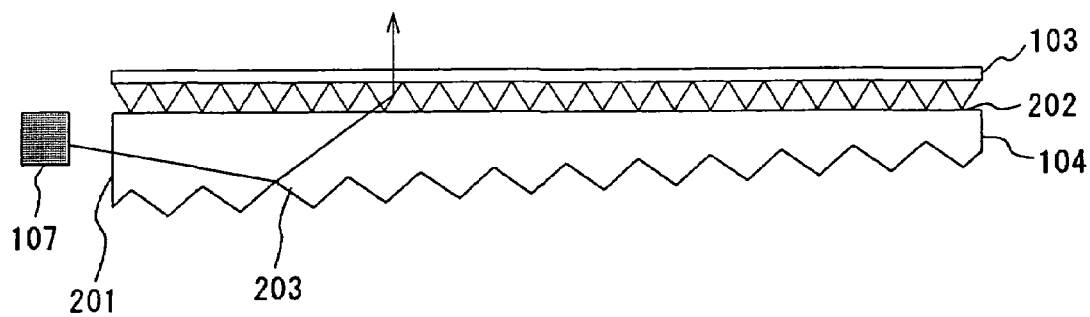
FIG. 5 is a view to explain optical properties of a backlight unit according to a preferred embodiment of the present invention.

FIG. 2 is an exploded perspective view to explain a schematic structure of a sidelight type backlight unit according to this embodiment. The backlight unit improves the uniformity of light from the light source 107 and emits the uniform planar light toward the liquid crystal display panel 102. More specifically, as shown in FIG. 5, the light from the light source 107 enters the light guide plate 104 and travels through the plate. A portion of the light reflected by the backside of the light guide plate 104 or the reflection sheet 105 exits through the top surface of the light guide plate 104. The light is then deflected by the prism sheet 103 in the direction perpendicular to the top surface of the light guide plate 104 and enters the liquid crystal display panel 102. Optical properties of the backlight unit will be detailed later.

In FIG. 2, the same reference symbols as in FIG. 1 designate the same elements. Some elements are not shown in the figure to clarify the description. LED chips are used as the light source 107 in the configuration shown in FIG. 2. A light emitting diode (LED) has better color characteristics than a CCFL, and thus is preferred for a light source. A LED chip serves as a point light source and emits highly directional light. Therefore, a plurality of LED chips are generally placed at regular intervals along a long side of an incident surface of a light guide plate. A white LED chip or a plurality of LED chips emitting different colors of light (red, green, and blue, for example) may be used. There is no limitation to the number of the LED chip. A lamp reflector (not shown) may be formed surrounding the LED chip not to reduce light use efficiency. The lamp reflector is formed, for example, by white organic resin or metal such as brass, stainless steel and aluminum composed of multilayer film whose inner surface is a white reflection layer, Ag reflection layer or polyester resin.

The light from the light source 107 enters the light guide plate 104. The light guide plate 104 improves the uniformity of the light from the light source 107 which is a point light source such as a LED or a linear light source such as a CCFL, to produce the uniform planar light. The light guide plate 104 may be formed by organic material with high light transmittance such as acrylic resin, polycarbonate resin, and polyolefin resin. Referring again to FIG. 2, a side surface of the light guide plate 104 facing the light source 107 is a light incident surface 201 through which the light from the light source 107 enters the light guide plate 104. A top surface of the light guide plate 104 is a light exit surface 202 through which the light exits toward the liquid crystal panel 102. The opposite surface of the light exit surface 202 is a back surface 203 of the light guide plate 104. The reflection sheet 105 is placed to face the back surface 203. A side surface 204 is another side surface of the light guide plate 104 which is between the light exit surface 202 and the back surface 203 and between the light incident surface 201 and the opposite surface.

The light having entered the light guide plate 104 through the incident surface 201 travels through the plate, repeating total internal reflection. Since the reflective index of the light guide plate 104, which is generally approximately 1.5, is higher than that of the air, the light is totally reflected by the surface of the light guide plate 104 and travels through the light guide plate 104. Some structure to break the condition for the total internal reflection is therefore needed to let the light exit through the light exit surface 202. Thus, a specific structure to control a light exit angle from the light guide plate 104 is formed on the back surface 203 of the light guide plate 104. By this structure, the light path is directed perpendicularly to the light exit surface 202, and thus the light exits through the surface.

A preferred embodiment of the above structure is a mirror-polished prism structure. The back surface 203 of the light guide plate 204 shown in FIG. 2 has a plurality of V-shaped ridges. The V-shaped ridges serve as prisms to control a light exit angle. The ridges stand out from the back surface 203. The cross-sections of the V-shaped ridges are trigonal-shaped. The ridges extend from the side surface 204 to the opposite side surface. A continuous series of V-shaped ridges along the light incident surface 201 may be arranged parallel with each other in the direction from the light incident surface 201 to the opposite side surface.

The light having entered the light guide plate 104 through the light incident surface 201 and heading to the opposite side surface turns upward to the light exit surface 202 by the V-shaped ridges. The V-shaped ridges change the direction of the light traveling along a directional axis from the light incident surface 201 to the opposite side surface toward the direction perpendicular to the light exit surface 202. The V-shaped ridges do not substantially diffuse light, thus non-diffused light is incident on the light exit surface 202. The V-shaped ridges on the back surface 203 of the light guide plate 104 can be replaced by other-shaped prisms which function the same way. For example, an intermittent series of V-shaped ridges may be formed along the light incident surface 201 from the side surface 204 to the opposite side surface.

It is also possible to form an intermittent series of V-shaped ridges along the side surface 204 from the side surface 201 to the opposite side surface. Instead of forming the ridges, V-shaped grooves may be formed on the back surface 203 as the prism structures. Further, a concavo-convex pattern may be formed on the back surface 203 by a technique such as sandblasting and stamping. The concavo-convex pattern, however, greatly scatters light. The prism structures which hardly scatter light such as V-shaped ridges with smooth surfaces are preferred to increase luminance.

An anisotropic diffraction grating is formed on the light exit surface 202. The anisotropic diffraction grating has anisotropy in diffusion of transmitted light. Transmitted light greatly diffuses in the principal diffusion direction, while not substantially diffuses or diffuses only slightly in the direction perpendicular to the principal diffusion direction. The principal diffusion direction is set along the light incident surface 201 and corresponds to the direction from the side surface 204 to the opposite side surface. The use of a CCFL as a light source is likely to cause reduced luminance at the edges of the light exit surface 202 extending from the light incident surface 201 to the opposite side surface. This is because electrodes of the CCFL are located in plane of the light incident surface. The use of a LED chip, on the other hand, is likely to generate bright portions called hot spots, and dark portions between the LED chips. This is because the LED chip is a point light source emitting highly directional light. It is therefore required to diffuse the light from the light source 107 in the direction from the side surface 204 to the opposite side surface for uniform luminance over the entire plate.

The anisotropic diffusion grating is preferably composed of a hologram pattern. The hologram pattern may be formed integrally with the light guide plate by a known technique such as double beam exposure. The use of the hologram pattern allows effective control of light diffusion. The hologram pattern integrally formed on the light exit surface 202 has a concavo-convex pattern with fine pitches to control the diffusion direction of the exiting light from the light guide plate 104.

Figure 3:
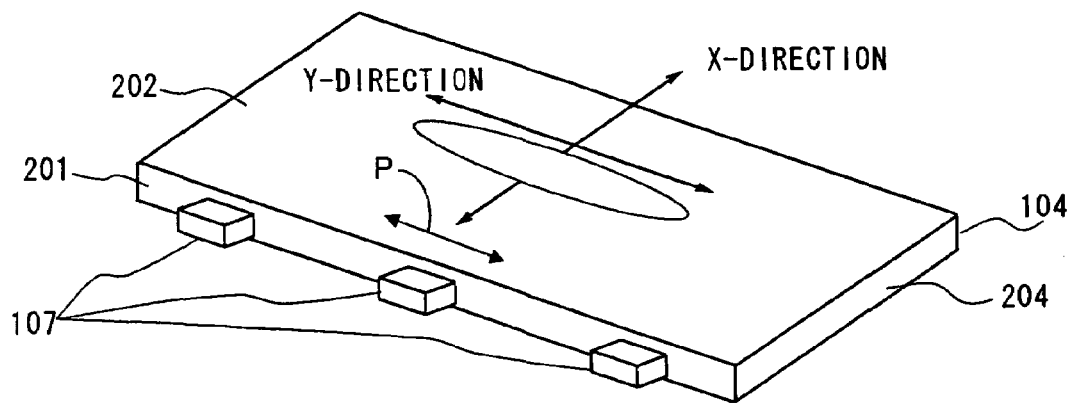
FIG. 3 is a view to explain optical properties of a hologram pattern according to a preferred embodiment of the present invention.

FIG. 3 is a view to explain light diffusion by the hologram surface in this embodiment. The hologram pattern in this embodiment is an optical pattern for anisotropic diffusion. The principal diffusion direction (see, e.g., directional arrow P in FIG. 3) of the hologram pattern is the direction from the side surface 204 to the opposite side surface. The direction is along the light incident surface 201, but not necessarily parallel with it. The light passing through the hologram pattern is greatly diffused in the Y-direction from the side surface 204 to the opposite side surface. The light is not substantially diffused or diffused only slightly in the X-direction from the light incident surface 201 to the opposite side surface.

This control of the diffusion direction allows suppression of unwanted diffusion of light, thus increasing the front luminance. The loss of light at diffusion can be also suppressed since the hologram has high light use efficiency. Therefore, significant increase of the luminance of the backlight unit is achieved. It is also possible to form the hologram pattern on the back surface 203 and light emission angle control structures such as the prism structures on the light exit surface 202.

Referring back to FIG. 2, the reflection sheet 105 is placed to the back of the light guide plate 104. The reflection sheet 105 is formed by depositing a metallic reflection layer such as silver (Ag) and aluminum (Al) on a formed resin substrate or resin substrate sheet. The metallic reflection layer such as Ag and Al may be replaced by a multilayer film using polyester resin or a reflection layer using liquid crystal material. The use of a white reflection sheet is also possible; however, since a reflection sheet having a specular reflection layer with little to no light diffusivity is preferred for higher luminance, the metallic reflection layer such as Ag and Al is most desirable.

Figure 4:
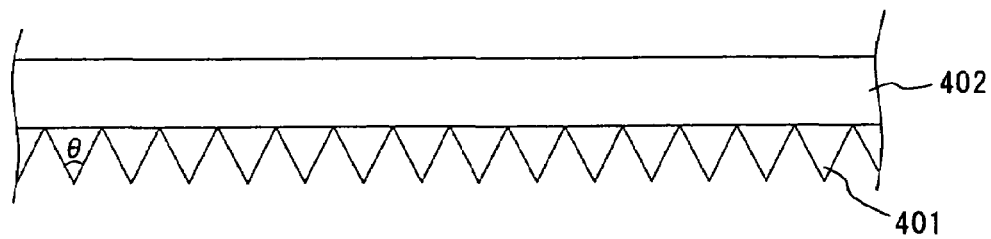
FIG. 4 is a view showing a schematic structure of a prism sheet according to a preferred embodiment of the present invention.

Referring again to FIG. 2, the prism sheet 103 is placed between the light guide plate 104 and the liquid crystal display panel 102. The prism sheet 103 is placed so that the prism structures face the light guide plate 104, and it is generally called a downward-pointing prism sheet. Referring now to FIG. 4, the prism sheet 103 generally has a substrate film 402 such as polyethylene terephthalate with a plurality of prism structures 401 formed thereon by organic resin such as acryl. The sheet has the thickness of several tens to several hundreds of $\mu$m. The prism structures 401 are formed on the surface of the prism sheet 103 facing the light exit surface 202 of the light guide plate 104.

The prism structures 401 deflect the light traveling along the directional axis from the light incident surface 201 to the opposite side surface (which will be referred to hereinafter as a light-collecting direction) typically in the direction perpendicular to the light exit surface 202 or the display surface of the light crystal display panel 102. The light incident on the prism structures 401 is totally reflected by a slope of the prism structures 401 and exits with the path changed. The prism structures 401 are parallel with each other, and the cross-section of the prism sheet 103 is sawtooth-shaped. The ridge lines of the prism structures extend from side to side of the sheet. The cross-section of each of the prism structures 401 is substantially triangle-shaped. The apex angle $\theta$ of each of the prism structures 401 is preferably larger than 65 degrees and smaller then 68 degrees. More preferably, the apex angle is 66 degrees. The apex can be curved, and in this case, the apex angle can be also expressed as the angle at a virtual intersection point of two slopes of the prisms.

The prism sheet 103 is placed on the light exit surface 202 of the light guide plate 104 so that the prism structures 401 extends in the direction from the side surface 204 to the opposite side surface. The direction is not necessarily parallel with the light incident surface 201 or the principal diffusion direction of the hologram pattern. The use of the downward-pointing prism sheet with the above prism apex angle together with the light guide plate 104 with the hologram for anisotropic diffusion in the direction from the side surface 204 to the opposite side surface significantly increases the front luminance of the light from the backlight unit.

The optical operation of the backlight unit according to this embodiment will be explained hereinbelow with reference to FIG. 5. The light emitted from the light source 107 enters the light guide plate 104 through the light incident surface 201 and travels through the light guide plate 104, repeating total internal reflection. The incident angle of the light on the light exit surface 202 is changed by the prism structures formed on the back surface 203, and thereby the light exits through the light exit surface 202. The light incident on the prism structures is partly reflected and partly transmitted. The light exiting through the back surface 203 of the light guide plate 104 is reflected by the reflection sheet 105 placed on the backside of the light guide plate 104 to reenter the light guide plate 104.

The light whose reflection angle is changed by the prism structures is incident on the light exit surface 202 of the light guide plate 104. Since the incident angle of the light is smaller than the critical angle for total internal reflection, the light exits through the light exit surface 202 at a given angle. The exiting light is anisotropically diffused along the light incident surface 201 by the hologram pattern formed on the light exit surface 202. The light then enters the prism sheet 103. The light totally reflected by the slopes of the prism structures 401 changes the path to gather toward the normal to the display surface. The light is then emitted toward the display surface of the liquid crystal display panel 102.

It is also possible to provide a diffusion sheet on the exit surface 202 of the light guide plate 104 for uniform luminance on the display surface, or provide the prism sheet with a rough surface and integrate the prism sheet with the diffusion sheet. However, no use of the diffusion sheet is preferred in order to increase the overall luminance and the front luminance of the backlight unit. Thus, the use of the downward-pointing prism sheet placed directly on the exit surface of the light guide plate is preferred. No use of the diffusion sheet on the prism sheet is desirable. The present invention is applicable to various planar light source units besides backlights of display devices.

What is claimed is:

1. A planar light source unit comprising:
   a light source;
   a light guide plate having a light incident surface through which light from the light source enters, a light exit surface through which light exits, and an anisotropic diffraction grating formed on the light exit surface or a surface opposite to the light exit surface for diffusing light in a principal diffusing direction along the light incident surface; and
   a prism sheet for collecting light traveling from the light incident surface to an opposite side surface, having a plurality of prism structures on a surface opposite to the light exit surface, each of the plurality of prism structures having an apex angle of larger than 65 degrees and smaller than 68 degrees,
   wherein the anisotropic diffraction grating does not substantially diffuse light in a direction perpendicular to the principal diffusing direction.

2. A planar light source unit according to claim 1, wherein the anisotropic diffraction grating comprises a hologram pattern integrally formed on the light guide plate.

3. A planar light source unit according to claim 2, wherein an apex angle of each of the plurality of prism structures is 66 degrees.

4. A planar light source unit according to claim 2, wherein the light guide plate has smooth prism structures on a surface opposite to a surface where the anisotropic diffraction grating is formed for controlling an emission angle of light exiting through the light exit surface.

5. A planar light source unit according to claim 2, wherein the prism sheet is directly placed on the light exit surface.

6. A planar light source unit according to claim 1, wherein an apex angle of each of the plurality of prism structures is 66 degrees.

7. A planar light source unit according to claim 1, wherein the light guide plate has smooth prism structures on a surface opposite to a surface where the anisotropic diffraction grating is formed for controlling an emission angle of light exiting through the light exit surface.

8. A planar light source unit according to claim 1, wherein the prism sheet is directly placed on the light exit surface.

9. A display device, comprising:
 a planar light source unit; and
 a display panel displaying images by controlling transmission of light from the planar light source unit;
 the planar light source unit comprising:
 a light source;
 a light guide plate having a light incident surface through which light from the light source enters, a light exit surface through which light exits, and an anisotropic diffraction grating formed on the light exit surface or a surface opposite to the light exit surface for diffusing light in a principal diffusing direction along the light incident surface; and
 a prism sheet for collecting light traveling from the light incident surface to an opposite side surface, having a plurality of prism structures on a surface opposite to the light exit surface, each of the plurality of prism structures having an apex angle of larger than 65 degrees and smaller than 68 degrees
 wherein the anisotropic diffraction grating does not substantially diffuse light in a direction perpendicular to the principal diffusing direction.

10. A display device according to claim 9, wherein the anisotropic diffraction grating comprises a hologram pattern integrally formed on the light guide plate.

11. A display device according to claim 10, wherein an apex angle of each of the plurality of prism structures is 66 degrees.

12. A display device according to claim 10, wherein the light guide plate has smooth prism structures on a surface opposite to a surface where the anisotropic diffraction grating is formed for controlling an emission angle of light exiting through the light exit surface.

13. A display device according to claim 10, wherein the prism sheet is directly placed on the light exit surface.

14. A display device according to claim 9, wherein an apex angle of each of the plurality of prism structures is 66 degrees.

15. A display device according to claim 9, wherein the light guide plate has smooth prism structures on a surface opposite to a surface where the anisotropic diffraction grating is formed for controlling an emission angle of light exiting through the light exit surface.

16. A display device according to claim 9, wherein the prism sheet is directly placed on the light exit surface.

* * * * *